(12) United States Patent
Uesaka (10) Patent No.: US 6,775,669 B2
(45) Date of Patent: Aug. 10, 2004

(54) RETRIEVAL PROCESSING METHOD AND APPARATUS AND MEMORY MEDIUM STORING PROGRAM FOR SAME

(75) Inventor: Hiroyuki Uesaka, Tsuchiura (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,403

(22) Filed: Mar. 19, 1999

(65) Prior Publication Data

US 2003/0033304 A1 Feb. 13, 2003

(30) Foreign Application Priority Data

Mar. 19, 1998 (JP) .......................................... 10-070017

(51) Int. Cl.⁷ .............................................. G06F 17/30
(52) U.S. Cl. .............................. 707/10; 707/3; 707/102; 707/104.1
(58) Field of Search ............................. 707/1–10, 101, 707/104, 201; 709/223; 345/329; 382/305

(56) References Cited

U.S. PATENT DOCUMENTS

| | | | | |
|---|---|---|---|---|
| 5,408,608 A | * | 4/1995 | Ryu et al. ...................... 707/10 |
| 5,757,983 A | * | 5/1998 | Kawaguchi et al. ......... 382/305 |
| 5,761,436 A | * | 6/1998 | Nielsen ........................ 707/101 |
| 5,864,604 A | * | 1/1999 | Moen et al. ................... 379/88 |
| 5,890,164 A | * | 3/1999 | Nielsen ........................ 707/201 |
| 5,905,862 A | * | 5/1999 | Hoekstra ...................... 707/10 |
| 5,930,804 A | * | 7/1999 | Yu et al. ................... 707/104.1 |
| 5,951,642 A | * | 9/1999 | Onoe et al. .................. 709/224 |
| 5,987,510 A | * | 11/1999 | Imai et al. ................... 709/219 |
| 6,012,053 A | * | 1/2000 | Pant et al. ...................... 707/3 |
| 6,208,995 B1 | * | 3/2000 | Himmel et al. ............. 707/104 |
| 6,065,055 A | * | 5/2000 | Hughes et al. .............. 709/229 |
| 6,067,565 A | * | 5/2000 | Horvitz ....................... 709/218 |
| 6,085,187 A | * | 7/2000 | Carter et al. ................. 707/10 |
| 6,151,019 A | * | 11/2000 | Watanabe et al. ........... 345/329 |
| 6,151,624 A | * | 11/2000 | Teare et al. ..................... 707/5 |
| 6,163,778 A | * | 12/2000 | Fogg et al. ................... 707/10 |
| 6,219,818 B1 | * | 4/2001 | Freivald et al. ............. 714/799 |
| 6,260,061 B1 | * | 7/2001 | Krishnan et al. ........... 709/218 |
| 6,272,507 B1 | * | 8/2001 | Pirolli et al. ................ 707/513 |
| 6,353,825 B1 | * | 3/2002 | Ponte ............................. 707/5 |
| 6,415,368 B1 | * | 7/2002 | Glance et al. .............. 711/158 |
| 6,421,675 B1 | * | 7/2002 | Ryan et al. ..................... 707/3 |
| 6,484,149 B1 | * | 11/2002 | Jammes et al. .............. 705/26 |
| 6,546,393 B1 | * | 4/2003 | Khan ........................... 707/10 |
| 6,591,261 B1 | * | 7/2003 | Arthurs ....................... 707/10 |

OTHER PUBLICATIONS

Office Action cited by Japanese Patent Office in Japanese Patent Application No. hei 10–070017, mailed: Aug. 5, 2003.
Vol. 96, No. 40 (96–DPS–76), p. 25, May 17, 1996, Japan.
Japanese Office Action mailed Nov. 18, 2003 in Japanese Patent Application No. H10–070017.
Shinsuke Noguchi, Supporting WWW information retrieval by ADIPS mobile agents, Thesis 3 (the 56th), Information Processing Society of Japan, Mar. 17, 1998~19, 3–239~3–240.

* cited by examiner

Primary Examiner—Alford Kindred
Assistant Examiner—Anh Ly
(74) Attorney, Agent, or Firm—Staas & Halsey LLP (57) ABSTRACT

An information retrieval apparatus, method and memory medium storing a program therefor provide for storing, in a memory, identification information of information sources to be queried, in accordance with an information retrieval keyword, issuing inquiries to relevant information sources, based on respective identification information thereof stored in the memory, and updating the identification information stored in the memory based on retrieved information from the queried information sources. Each information source may be an information retrieval apparatus, all thereof interconnected in a local network and/or through the local network to a network outside of the local network.

5 Claims, 5 Drawing Sheets

RANK OF IMPORTANCE VS. NUMBER OF ACCESS

| NUMBER OF ACCESS | RANK OF IMPORTANCE |
|---|---|
| 1 - 10 | 1 |
| 11 - 30 | 2 |
| 31 - 100 | 3 |
| 101 - 300 | 4 |
| 301 - 1000 | 5 |
| 1001 ~ | 6 |

| NUMBER 400 | HOST NAME 410 | IP ADDRESS 420 | USER NAME 430 | KEYWORD 440 | URL 450 | DATE OF REGISTRATION 460 | LAST ACCESS DATE 470 | NUMBER OF ACCESS 480 | RANK OF IMPORTANCE 490 |
|---|---|---|---|---|---|---|---|---|---|
| 01 | tsukuba | 999.99.999.9 | uesaka | PATENT | WWW.XYZ.FU.7SU | 1998-01-10 | 1998-02-27 | 5 | 1 |

RANK OF IMPORTANCE VS. NUMBER OF ACCESS

| NUMBER OF ACCESS | RANK OF IMPORTANCE |
|---|---|
| 1 - 10 | 1 |
| 11 - 30 | 2 |
| 31 - 100 | 3 |
| 101 - 300 | 4 |
| 301 - 1000 | 5 |
| 1001 ~ | 6 |

RETRIEVAL PROCESSING METHOD AND APPARATUS AND MEMORY MEDIUM STORING PROGRAM FOR SAME

BACKGROUND OF THE INVENTION

1. Field of the Invention

The present invention relates to an information retrieval method and apparatus and a related program in a memory medium, for the retrieval of information and the creation of a record, in memory, concerning the location of that information and, more particularly, to an information retrieval method and apparatus and related program in a memory medium which can retrieve, efficiently, useful information which is used frequently by one or more users on a local network. The information retrieval is executed by a user making an inquiry for the required information, such as by a keyword search request, on a user-friendly interface. The apparatus, method, and program of the invention will efficiently retrieve the required information and store the retrieved, required information in a memory of the user's apparatus (memory section), making future retrieval of that information by the same or other users on the local network more efficient.

2. Description of the Related Art

Recently, with the growth of the Internet, the number of home pages, or web sites, which contain useful information is greatly increasing. A user generally uses a mechanism, such as a search engine, etc., to search for the required information.

The retrieval mechanism, using an existing search engine, requires procedures such that an access is made to a home page of a search engine offering the service. Retrieval is executed by inputting a keyword.

When the search is completed, the search engine will return a list of all information that matches the keyword (so-called, "hits"). This often results in significant volumes of information being returned, much of it redundant and almost all of which is superfluous to the specific requirement. The user, moreover, must manually search through the retrieved information to find the most important information corresponding to the keyword.

Further, once the information has been retrieved and to enable future retrieval of this such information, the user may register the URL (Internet address), of the home page from which the information was retrieved, in a list by performing a task commonly referred to as "bookmarking." Future access to the desired home page is executed simply by selecting the respective URL address from the "bookmark" list. The "bookmark" list, however, requires periodic manual maintenance in order to maintain the content thereof current.

Since these tasks are executed on a personal computer of a specific user, it is necessary to manually supply identification information, such as a required URL retrieved by one party, to a third party who has a requirement for the same identification information.

Moreover, in order to obtain important information on a timely basis, a user must periodically access each particular information source (e.g., home page) to check and determine whether new information has been added or whether changes have been made.

The foregoing tasks for obtaining and upgrading information are time consuming and greatly reduce the efficiency and effectiveness of retrieving information under conventional, current-day techniques and equipment.

SUMMARY OF THE INVENTION

The foregoing and other problems with the prior art are overcome by the invention, as to each of the apparatus, method, and program thereof stored in a memory medium. More particularly, an information retrieval apparatus, such as a personal computer ("PC"), in accordance with the present invention, includes a memory section or data base storing identification information of respective processing apparatuses which may be queried in accordance with a keyword search request. The identification information comprises plural records, each record including an IP address and name identification of a respective processing apparatuses, or personal computer (PC), a URL thereof, a keyword and related information such as a date of registration, a last access date, a number of accesses and a rank of importance of the record.

A keyword search request, or information retrieval request, input by a user of the user/inquiring PC is received by the user PC interface, which performs an initial search of the database (memory) of the user PC, to retrieve therefrom identification information for respective highest ranked information source relevant to the keyword search request/inquiry and which may include the file name of the user's own processing apparatus. If a file name is retrieved, the existence of the requested information is affirmed and the URL retrieved from the corresponding record is displayed and the access number is incremented and, in accordance with predetermined access number ranges, a rank of importance in the record for the involved information source is updated.

If no identification information is available from the data base of the user PC, a further search is conducted for identifying from the data base of the user/inquiring PC any third party PCs connected to the common local network and having a highest order of importance for the keyword of the search request. If such a third party PC exists, the system retrieves the URL and displays same to the inquiring/user PC information and updates the data base of the inquiring user PC accordingly.

If no such information is received, the user/inquiring PC requests the introduction of a different, third party PC, connected to the common local network by issuing the keyword search request over the local network. In other words, a keyword search is requested by the requesting (first) PC to the PCs on the network to obtain data information (step 127). If such a third party PC is identified, the requesting user PC sends the keyword to that introduced third party PC, a search is conducted based thereon; if identification information exists, the same is recognized and sent to the requesting user PC for display of the URL and updating the data base by creating a new record therein corresponding to the received information.

If no data information is available, i.e., if none of the PCs on the network has relevant information, the requesting PC chooses a second PC according to the rank of importance relative to that of the first PC itself and asks for identification information (112b). The identification information is an address (e.g., IP address) of which PC may have the relevant information. The responding (second) PC then looks for identification information stored in its database. The identification information is of the address of a third PC which is of higher rank of importance relative to that of the second PC itself. According to the identification information (e.g., IP address) of the third PC introduced by the responding (second) PC, the requesting (first) PC issues the request for data information concerning the keyword (112d).

Once the invention has determined that no relevant information exists on the local network, an automatic connection to an Internet search engine is, or can be, effected. The results of the Internet search, once accessed by the user, likewise may be used to create a new record and thereby update the data base of the inquiring user PC.

Further, each third party PC which is accessed by an inquiring user PC may have the respective data base thereof updated to increment the number of accesses and correspondingly adjust the rank of importance of the record.

Accordingly, an object of the present invention is to provide a retrieval processing apparatus, method and related program in a memory medium that provides effective retrieval of information on the Internet. The present invention provides an apparatus that realizes effective retrieval of frequently used information with a simplified interface and simplified procedures relative to Internet searching procedures currently in use.

It is also an object of the present invention to provide such an apparatus, method and process in a memory medium that allows the sharing of URL address information by all users on a local network. The present invention will allow a user to easily search for desired information that has been previously retrieved by another user on the same local network.

The present invention furthermore provides a more efficient procedure to locate and share information on the Internet. This is in contrast to, and an improvement over, the conventional situation in which the returned information, provided by existing mechanical keyword retrieval, often results in significant volumes of information being returned as "hits", almost all of which is superfluous to the specific requirement. The user is required to search for and select the needed, specific information from the "hits", resulting in a significant time requirement.

A further object of the invention is to automate the registration of a URL for a home page so it may be accessed again, either by the original user or any other user, on the local network.

An additional feature of the present invention is to provide a processing apparatus that automatically shares all stored URL addresses among all users on a local network. Currently, individual users' URL lists are kept solely on the user's personal computer, with no means to share the information. In relation thereto, the present invention has, as a further object thereof, to provide a memory medium that automatically provides for the prioritization of stored URL's, based on frequency of usage. Conversely, previously stored URL's, which have not be accessed by any user on the local network for a user-prescribed period of time, will be deleted, thereby to preserve memory capacity.

The present invention, moreover, identifies an apparatus processing section (e.g., a personal computer) which has the most recent information for a specific keyword inquiry, as a "particular information source". This processing section is identified in the database, as such, and affords a preferential query to improve overall efficiency.

In addition, a user, in conventional systems, currently has no way to determine if additional, or updated, useful information is available on a particular home page. In order to make this determination, the user is required to check, by periodically making access to that particular information source (e.g., a home page). This invention combines the results of many users' searches for information and updates the memory with the most current locations and addresses where relevant information is stored.

BRIEF DESCRIPTION OF THE DRAWINGS

These and other objects and advantages of the invention will become apparent and more readily appreciated from the following discussion of the preferred embodiments, taken in conjunction with the accompanying drawings, of which.

DESCRIPTION OF THE PREFERRED EMBODIMENTS

Figure 1:
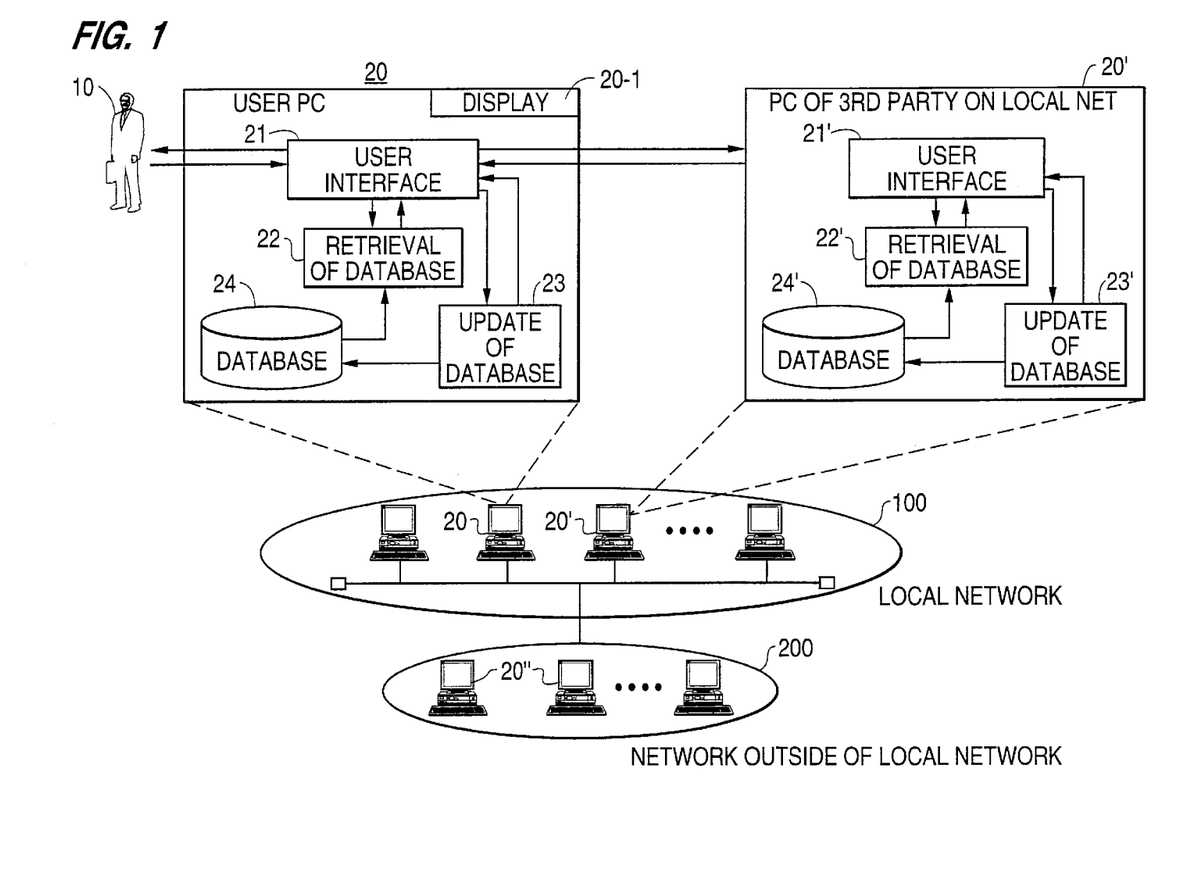
FIG. 1 is a structural diagram of the information retrieval apparatus of the present invention.

FIG. 1 shows an embodiment of an information retrieval apparatus in accordance with the present invention. In FIG. 1, a user 10 has a personal computer (USER PC) 20 connected to a local network 100 which interconnects plural such personal computers, illustrated by a representative third party PC 20', the plural PCs of the network 100 being configured the same as the USER PC 20.

The user personal computer 20 is provided with a user interface 21 which executes the processing required for information retrieval. The user interface 21 receives an information retrieval instruction (i.e., a keyword request) from the user 10. In response, the USER PC 20 queries and retrieves information from its own database 24 and, when appropriate, issues a retrieval request, or query, to the other personal computers 20' in the local network 100. The user interface 21 not only inputs such requests from the corresponding user 10 but also imports to the USER PC 20 retrieval requests from the respective, other users of the third party PC's 20', via the local network 100.

Database 24 administers the identification information (i.e., the URL addresses) of respective processing apparatuses (e.g., personal computers) having the specific type of information, or data, designated by respective keywords of a search request, or inquiry. Moreover, a program 22 for retrieving information from the database 24 and a program 23 for updating the database 24 are also resident in the USER PC 20.

The third party personal computer 20'($3^{rd}$ Party PC) connected to the USER PC 20 via the local network 100, is configured the same as the USER PC 20 and includes a user interface 21', a database 24' likewise storing respective identification information (i.e., the uniform resource locator ("URL") address) of respective processing apparatus having the specific type of information, or data, designated by respective retrieval keywords, a program 22' for executing the retrieval process of the database 24' in response to a keyword request, or inquiry, transmitted thereto from the user interface 21', and a program 23' for executing the update process (addition and/or deletion) of the content of the database 34'. Although not illustrated FIG. 1, each (further, third party) personal computer 20", provided in the network 200, outside the local network 100, has the same configuration.

Figure 5:
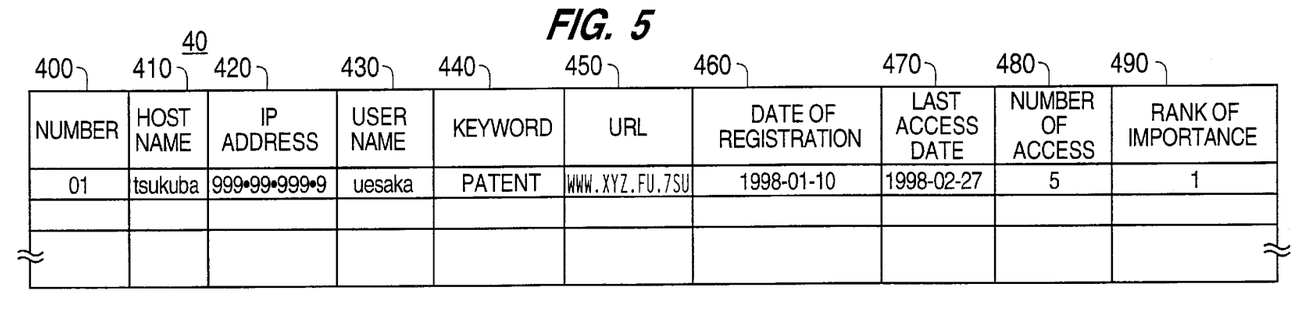
FIG. 5 is a diagram illustrating a structure of the database in accordance with the present invention.

To support the following discussion of the flow processes, the structure of the database 24 first will be explained, with reference to FIG. 5. A single record 40, as stored in the database 24, includes a record number 400, a host name 410, an IP address of a host 420, a name of a host user 430, a keyword used for information retrieval 440, a URL 450 for indicating an address of information which includes, or is responsive to, the keyword, a date of registration of the record 460, a latest access date to the record 470, a number of times the record has been used 480, and a rank of importance of the record 490. Generally, plural pairs of keywords 440 and URL's 450 are provided in a single record 40.

Additionally, the database also typically stores (not shown in FIG. 5) not only the information about other processing apparatus of the network but also information about itself. For example, a file name, relevant to a respective keyword inquiry and which is resident in the user's processing apparatus, e.g., USER PC 20 would also be stored in the URL column 450 of FIG. 5.

The latest access date 470 contains the latest, i.e., most recent, hit date for a keyword retrieval. As will be explained later, a record having a date older, or earlier, than a user settable period is considered to have a lower "worth of use, or value," and is assumed to be a candidate for deletion.

The number of times of use 480, is incremented by one for each hit in the keyword retrieval. Rank of importance 490 is computed and set to an increased value, in correspondence with the increases in the number of times of use 480. As a result, a particular user PC providing the most effective, or relevant, information for a given keyword inquiry, based on the rank of importance 490, can always be identified—and that user PC may be the USER PC 20 of user 10 or any other user on the network 100.

The information retrieval process flow is explained with reference to FIG. 2 and FIG. 3.

Figure 2:
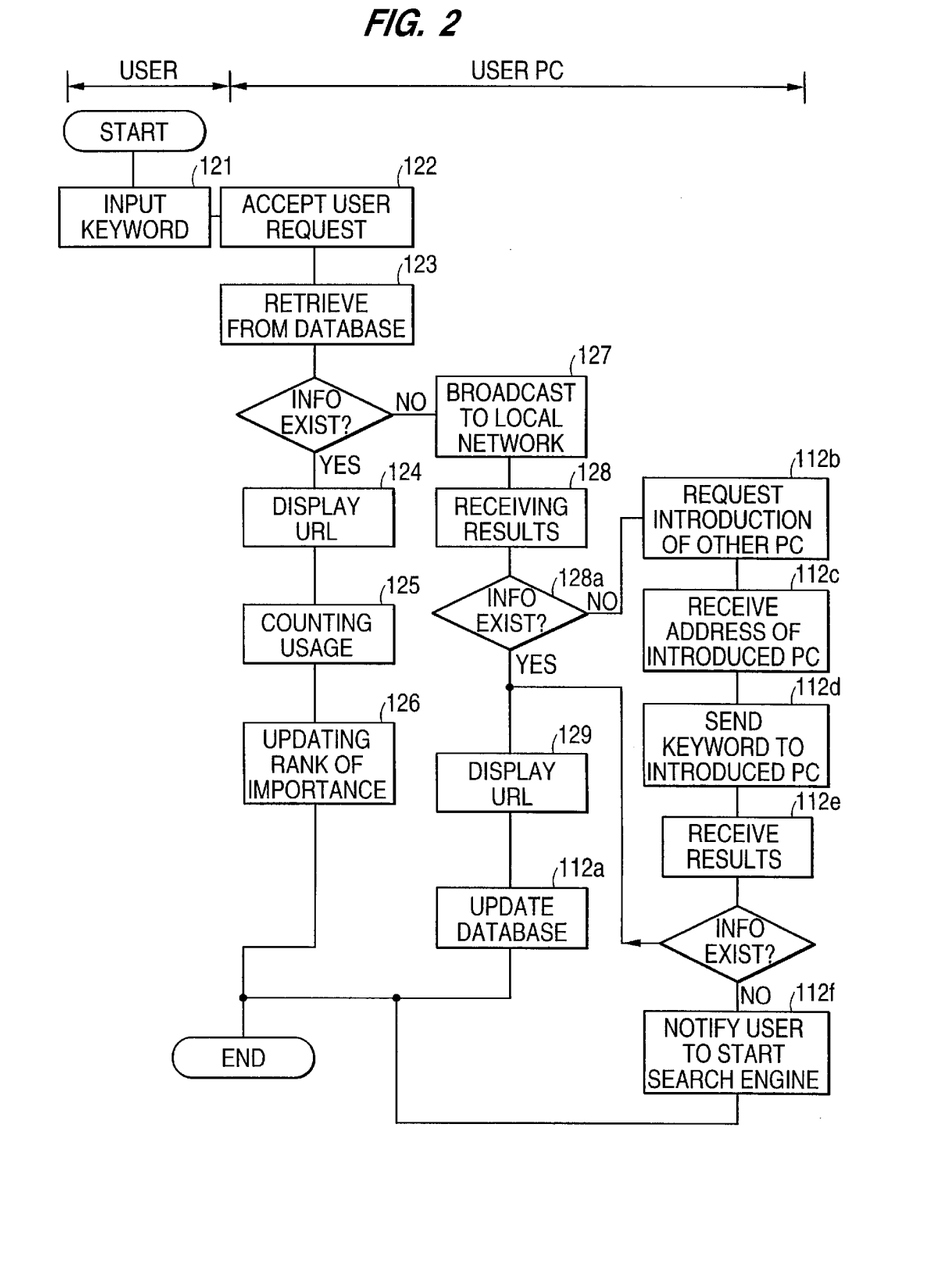
FIG. 2 is a flow chart illustrating a process of information retrieval in a local user's personal computer in accordance with the present invention.

In the step 121 of FIG. 2, a user requests information retrieval by inputting a search request including the keyword, for the information being searched, to the user interface (UI) 21. In step 122, the UI 21 accepts a user request. In step 123, the UI 21 queries, and retrieves information from, its own database 24 in accordance with the keyword; in this case, as between two (or more) hits, the record having the higher (or the highest) rank of importance is retrieved preferentially. A determination is made at step 123a as to whether the requested information exists in the retrieved record; when a practical file name is contained in the URL 450, it means the existence of information and the UI 21 obtains the file name. In step 124, this file name information is provided to the user as a display on the display unit 20-1 of the user PC (e.g., the USER PC 20 in FIG. 1).

Subsequently, in step 125, the number of times of use (i.e., of access times) 480 of the relevant record 40 is updated (i.e., incremented, or counted up). Moreover, in step 126, when the number of times of use has exceeded a selected reference value (i.e., as defined separately), the value in the rank of importance 440 of the relevant record 40 is updated. As a result, not only does the system discriminate important information from lesser or non-important information, it also identifies the URL of the respective PC 20' storing the relevant identification information corresponding to the keyword inquiry.

If there is no relevant information in the personal computer 20 of a specific user 10, as determined at step 123a (see FIG. 2), the UI 21 requests, in step 127, the retrieval of identification information from the third parties' personal computers 20' connected to the local network 100. This is accomplished preferably, at step 127, with the transmission of broadcast messages to the local network 100. However, broadcasting is not essential and any conventional, or suitable, method or procedure may be employed.

Figure 3:
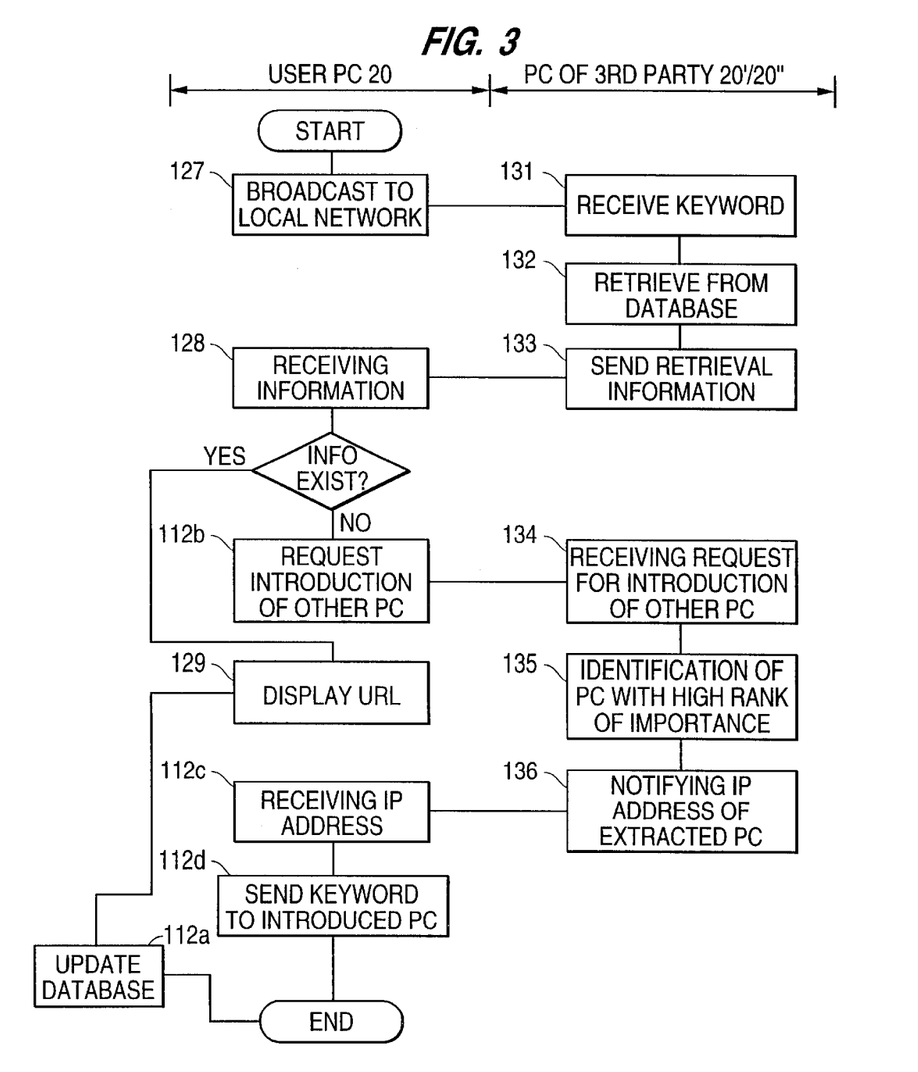
FIG. 3 is a flow chart illustrating a process of information retrieval in a personal computer of a third party in accordance with the present invention.

In FIG. 3, the UI 21' of the third party PC 20' receives the keyword search request in step 131 and queries the database 24' thereof in step 132. In step 133, the retrieval result is sent to the requesting personal computer (here, the USER PC 20). The retrieval result (e.g., the relevant record including URL, etc.) is transmitted when there is information. As a result, a user can easily obtain information from another user.

In FIG. 2, the requesting USER PC 20 receives the retrieval information in step 128 and the UI 21 presents the URL information, if it exists (228a), to the user 10 through the display of same on the screen 20-1, in step 129. Additionally, in step 112a, the requesting USER PC 20 adds the information (i.e., record) thus obtained to its own database; and thus updates the latter. As a result, a user can automatically accumulate, in the user's own database, the information that has been acquired by other users. This provides the user with the ability to effectively execute additional information retrievals for the same keyword without the need to query other user PC's on the local network.

If the inquiring PC determines from the broadcast to the local network that there is no information available, an inquiry is made in step 112b to determine whether or not there is a personal computer having any relevant information. (This may be done preferably by a unicast; however, again, any conventional or suitable procedure may be employed in the alternative.) In this circumstance, there are three independent PCs having respective, different roles. The first is the requesting, user PC 20; the second is the responding PC, i.e., that is one of a "higher rank of importance" relatively to the first PC; and the third PC is one of a "higher rank of importance" relatively to the second PC, as memorized in its local data base. Thus, in the steps 112b and 112c of FIG. 2 (including steps 134–136 of FIG. 3), the third PC's IP address is informed to the (first) requesting PC from the responding (second) PC. Further, after receiving the address, the requesting (first) PC performs the next search (i.e., a keyword search) in the newly introduced third PC (step 112d and 112e).

In this case, by searching its own database 24, as done by USER 10 of USER PC 20 in FIG. 1, a third party PC 20' that has a higher rank of importance 490 (FIG. 5) is identified as the "particular information source". An inquiry message, containing a keyword, is transmitted from the inquiring USER PC 20 to the third party personal computer 20' thus identified as the "particular" or "target" information source—as shown for third party PC 20' in FIG. 3 at step 134. The inquiry target PC, by searching its own database, may identify a personal computer having a higher rank of importance corresponding to the keyword, at 135. This newly identified personal computer is referred to as the "introduced PC." The inquiry target notifies the inquiring personal computer, at step 136, of the IP address of the introduced personal computer."

The inquiring personal computer receives the information (IP address) of the "introduced personal computer" in step 112c and originates an inquiry, with the keyword, to that "introduced personal computer" in step 112d. A response from the target PC 20', containing the retrieval result, is recorded by the "inquiry personal computer" in step 112e (FIG. 2). When there is information, the user of the "inquiry personal computer" is notified by a display of such information on the display unit in step 129 (FIG. 2).

Further, at step 112a, the data base of the "inquiry personal computer" is updated as before-described. As a result of the above processing, the apparatus memory section (i.e., database memory) can be expanded continuously, effectively in a "chain reaction mode.}

When there is no information available on the network from any such "target" PC or "particular information source", a connection is established to the home page having an adequate search engine, at step 112f (FIG. 2), urging the user to proceed with ordinary information retrieval. A user is not required to execute any operation to access the search engine, thus creating additional efficiencies in an information search. When information is retrieved by the search engine, and, after being accessed by the user, it is added to the user's database, and FIG. 5 is updated with all relevant, required information.

Figure 4:
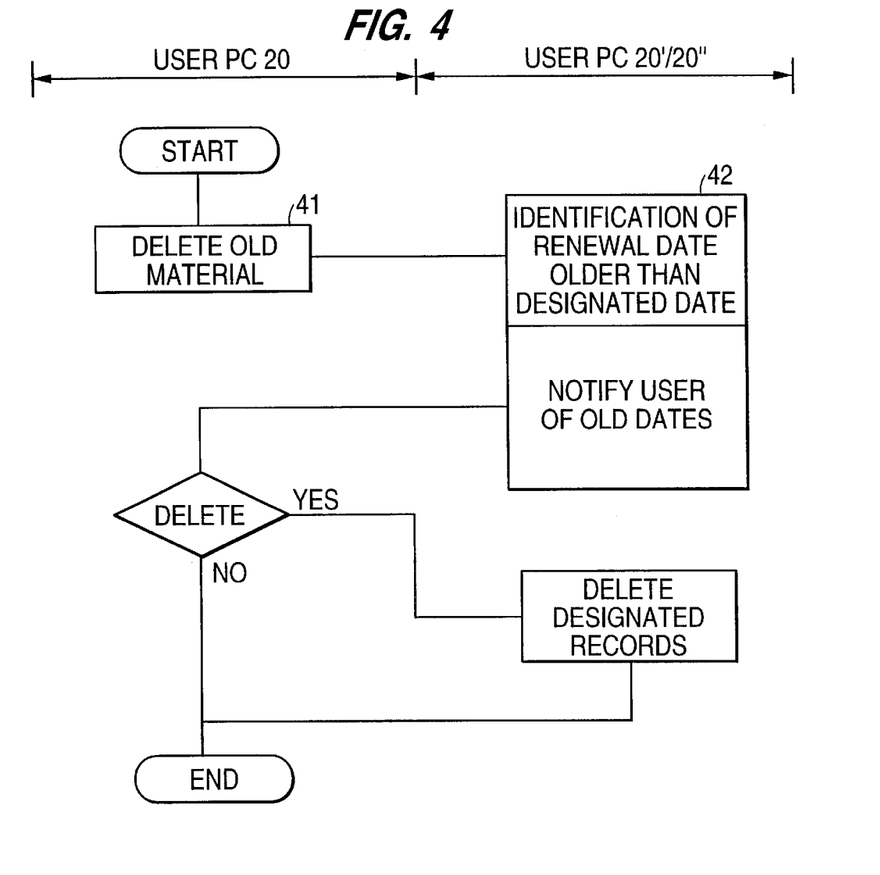
FIG. 4 is a flow chart illustrating a process of deleting information from a database in accordance with the present invention.
Figure 6:
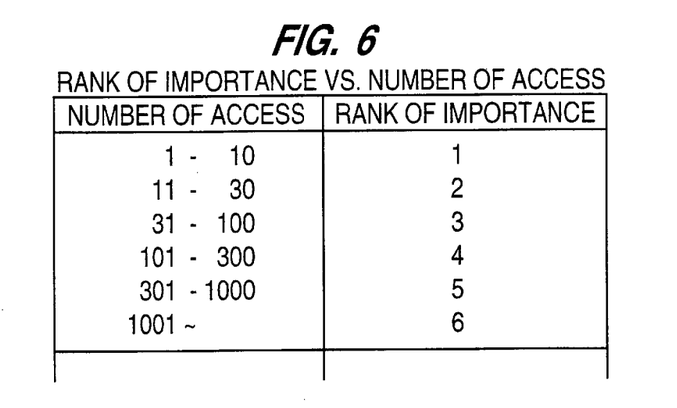
FIG. 6 is a table illustrating the change of the rank of importance of stored information, based on usage or frequency of access, in accordance with the present invention.

FIG. 4 shows the process flow for automatically deleting lower rank information from the user's own database, based on usage. To initiate this, a user selects the delete mode of this system process flow, in step 41. This can be accomplished by depressing the right button of a mouse on the UI 21. Once the database deletion mode is initiated, the UI 21 identifies the records in step 42, based on the most current access date of the record in the database. The UI 21 presents deletion candidates to the user. When the user executes the delete command, step 43, the records are deleted, step 44 . If the user chooses not to delete the identified records, the data remains stored, as is. By having this capability, the efficiency of information retrieval and the availability of more current data are increased. In summary, in steps 121–126, the user PC 20 receives a keyword of a search request which is input (at 21) by the user 10 to the user's own PC 20; upon accepting same (at 22), the UI 21, in a first retrieval search, queries its own data base 24 in accordance with that keyword, thereby to retrieve from the data base 24, preferentially, a record 40 of the highest rank of importance 490 (FIG. 5). A "file name" in the URL 450 identifies an address in the data base 24, of the user PC 20, at which "data" information relevant to the keyword is stored and may be retrieved. The existence of the file name in the URL 450 confirms the existence of data information relevant to and/or containing the keyword of the search request input by the user, at 123a. Accordingly, that file name (URL), derived from the retrieved record 40, is displayed to the user 10 (at step 124). In addition, the number of accesses (i.e., times of use) 480 in the respective record 40 is incremented (i.e., counted up by one count), at step 125. The incremented count value of the number of times of use 480, relative to the preestablished ranges of the numbers of accesses, as shown in FIG. 6, is used to update the rank of importance 490 (at step 126). Specifically, as the incremented number of accesses exceeds the respective, current range, the rank of importance is advanced to the next level—at which it remains until the respective, next successive range of the number of accesses for 80 is again exceeded.

If no description information is uncovered as a result of the first retrieval search, i.e., no address in the data base 24 of the user PC 20 is identified at which relevant data information may be uncovered, at step 123a, the interface unit 21 proceeds to conduct a second keyword retrieval search based on existing records in the memory identifying third party user PCs 20' connected to the local network 100, at step 127. Specifically, the UI 21 of the user PC 20 performs the keyword search in the records 40 of the data base 24 and, when a match is found, retrieves from the data base 24 thereof the keyword matching records 40 (preferentially, the record 40 having the highest rank of importance 490 for the matching keyword 440). The results from the search are retrieved, at 128 and, when information is found to exist, at 128a, the URL is displayed to the user, at 129, and the data base is updated, at 112a, as previously explained relative to the number of access 480 and the rank of importance 490 of the existing record 40.

If the preceding keyword search for records in the data base 24 of the user PC 20 fails to produce an identification information in the retrieved results at 128a, the UI 21 of the requesting user PC 20, at step 112b, makes a general inquiry (i.e., "request introduction of other PC") of whether or not there is a third party PC 20 in the local network 100 having in the corresponding data base 24' thereof identification information of an information source relevant to the keyword search request—and, preferentially, a third party PC 20' having a higher rank of importance than the rank of importance of any record 40 in the data base 24 of the requesting PC 20 relevant to the keyword search request. For purposes of delineation, any such "introduced" third party PC 20', which is so identified based on the keyword search request transmitted over the local network 100, may be characterized alternatively as a "particular information source" or an "inquiry destination."

The user, or inquiry, PC 20 receives the address of the introduced PC at step 112c and sends the keyword request of the user to the introduced PC at step 112d. The introduced, or third party, PC 20' then queries the data base 24' thereof based on the keyword and the results of which are received at 112e. If the information corresponding to the keyword request exists, namely the URL of a record 40' retrieved from the introduced/third party PC 20' having identification information for a respective data information source relevant to the keyword request, the URL 450 of that record is displayed at the requesting, user PC, step 129, and the data base 24 thereof is updated, at step 112a, to include the identification information for the "other" or "inquiry destination" third party PC's record 40. Thus, the source of relevant information stored in the user PC 20 can be expanded continuously and automatically, to include records 40 derived from data bases of any others of the third party PCs 20' connected to the common local network 100, in what is seen to be a "chain reaction mode."

Alternatively, if no information exists in the results received at step 112e, the user is notified at step 112f to start the user's search engine and conduct an Internet search in a conventional fashion and the user PC 20 may automatically connect to the home page in conjunction with step 112f. Further, the information retrieved by the search engine, once accessed by the requesting/user PC 20, may be added to the data base 24 of user PC 20 as a new record 40 therein.

While in the specifically disclosed, preferred embodiment, records of highest order of importance are based on numbers of access, different criteria, other than the number of accesses, may be established for modifying the rank of importance and, further, alternative ranks of importance, as well, may be established and used in combination for defining the retrieval of information. Moreover, while activity over a time period since the registration date of a record may result in deletion of the record, alternatively, the rank of importance instead may be reduced in stages, prior to deletion of the record.

Thus, while the foregoing has disclosed a specific, preferred embodiment of the present invention, those of skill in the art will understand that the invention is subject to numerous modifications and adaptations and thus all such modifications and adaptations as fall within the true spirit and scope of the invention are intended to be encompassed by the appended claims hereto.

What is claimed is:

1. An information retrieval apparatus, comprising:

a database to store a plurality of locators, each of the plurality of locators specifying an address of information with a corresponding keyword and rank of importance of the locator;

a receiving unit to receive a keyword search query including a search keyword from a user;

a retrieval unit to retrieve one of the addresses of information in response to receiving said keyword search query;

a first requesting unit, in the absence of a result of retrieving by said retrieval unit, to extract a locator having a high rank of importance from said database, and to make a request to an information retrieval apparatus specified by the extracted locator to introduce other information retrieval apparatuses; and a second requesting unit to make a request to the information retrieval apparatuses specified with the results of requesting of said first requesting unit to retrieve one of the addresses of information from their own databases using said search keyword.

2. An information retrieval apparatus, comprising:

a database to store a plurality of locators, each of the plurality of locators specifying an address of information with a corresponding keyword and rank of importance of the locator;

a receiving unit to receive a keyword search query including a search keyword from a user;

a retrieval unit to retrieve one of the addresses of information in response to receiving said keyword search query;

a first requesting unit, in the absence of a result of retrieving by said retrieval unit, to make a request to a plurality of other information retrieval apparatuses to retrieve one of the addresses of information from their own databases using said search keyword;

a second requesting unit, in the absence of a result of requesting by said first requesting unit, to extract a locator having a high rank of importance from said database, and to make a request to the information retrieval apparatuses specified with the extracted locator to introduce other information retrieval apparatuses; and a third requesting unit to make a request to the information retrieval apparatuses specified with the results of requesting of said second requesting unit to retrieve one of the addresses of information from their own databases using said search keyword.

3. The information retrieval apparatus of claim 2, wherein said first requesting unit makes a request to the plurality of other information retrieval apparatuses by broadcasting.

4. The information retrieval apparatus of claim 2, further comprising:

a notifying unit, to receive a request of retrieval with a search keyword from another information retrieval apparatus, to extract a locator having a high rank of importance from said database according to the keyword from the other information retrieval apparatus, and to notify the extracted locator to the other information retrieval apparatus.

5. The information retrieval apparatus of claim 2, wherein said database stores a number of accesses of each address of information, the number of accesses being incremented upward for each respective keyword search query.

* * * * *